US009209500B2

(12) United States Patent
Kim

(10) Patent No.: US 9,209,500 B2
(45) Date of Patent: Dec. 8, 2015

(54) TEMPERATURE CONTROLLING SYSTEM AND METHOD OF BATTERY

(71) Applicant: Samsung SDI Co., Ltd., Yongin-si, Gyeonggi-do (KR)

(72) Inventor: Ki-Seon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 315 days.

(21) Appl. No.: 13/831,114

(22) Filed: Mar. 14, 2013

(65) Prior Publication Data

US 2014/0087215 A1    Mar. 27, 2014

Related U.S. Application Data

(60) Provisional application No. 61/704,964, filed on Sep. 24, 2012.

(51) Int. Cl.
| | |
|---|---|
| H02J 7/04 | (2006.01) |
| H02J 7/16 | (2006.01) |
| H01M 10/627 | (2014.01) |
| H01M 10/48 | (2006.01) |
| H02J 7/00 | (2006.01) |
| H01M 10/66 | (2014.01) |
| H01M 10/44 | (2006.01) |

(52) U.S. Cl.
CPC ........ *H01M 10/5018* (2013.01); *H01M 10/443* (2013.01); *H01M 10/486* (2013.01); *H01M 10/5093* (2013.01); *H02J 7/0065* (2013.01)

(58) Field of Classification Search
CPC .......... H01M 10/5018; H01M 10/443; H01M 10/5093; H01M 10/486; H02J 17/0065

USPC .......................................................... 320/150
See application file for complete search history.

(56) References Cited

U.S. PATENT DOCUMENTS

| | | | |
|---|---|---|---|
| 2009/0315396 | A1 | 12/2009 | Ichikawa et al. |
| 2011/0298427 | A1 | 12/2011 | Uemura et al. |
| 2012/0228946 | A1* | 9/2012 | Sim et al. ......................... 307/80 |

FOREIGN PATENT DOCUMENTS

| | | |
|---|---|---|
| EP | 0 599 000 A1 | 6/1994 |
| EP | 2 346 138 A2 | 7/2011 |

(Continued)

OTHER PUBLICATIONS

Korean Patent Abstracts, Publication No. 1020080010698 A, dated Jan. 31, 2008, for corresponding Korean Patent 10-0912350 listed above, 2 pages.

(Continued)

*Primary Examiner* — Vuthe Siek
(74) *Attorney, Agent, or Firm* — Christie, Parker & Hale, LLP

(57) ABSTRACT

A temperature controlling system for a battery includes a converter, a DC linker, and an inverter. The converter includes a plurality of converter switches and an inductor. The converter is configured to be coupled to the battery to raise or drop a voltage output of the battery. The DC linker includes a capacitor and is configured to stabilize an output voltage of the converter. The inverter includes a plurality of inverter switches, at least one inductor, and an inductor switch coupled to the at least one inductor. The inverter is configured to invert the output voltage of the converter, wherein the inductor switch and at least one of the inverter switches are configured to form a current path for a current through the at least one inductor to the battery.

22 Claims, 4 Drawing Sheets

(56) References Cited

FOREIGN PATENT DOCUMENTS

| | | |
|---|---|---|
| JP | 2000-228231 | 8/2000 |
| JP | 2010-035372 | 2/2010 |
| JP | 2012-070502 | 4/2012 |
| KR | 10-2009-0043529 | 5/2009 |
| KR | 10-0912350 | 8/2009 |
| KR | 10-2010-0124488 | 11/2010 |
| KR | 10-1116428 | 3/2012 |
| WO | WO 2012/119232 A1 | 9/2012 |

OTHER PUBLICATIONS

Korean Patent Abstracts, Publication No. 1020120007224 A, dated Jan. 20, 2012, for corresponding Korean Patent 10-1116428 listed above, 2 pages.

EPO Search Report dated May 12, 2014, for corresponding European Patent application 13185612.2, (5 pages).

* cited by examiner

TEMPERATURE CONTROLLING SYSTEM AND METHOD OF BATTERY

This application claims priority to and the benefit of U.S. Provisional Application No. 61/704,964, filed on Sep. 24, 2012 in the U.S. Patent and Trademark Office, the entire content of which is incorporated herein by reference.

BACKGROUND

1. Field

An aspect of embodiments according to the present invention relates to a temperature controlling system of a battery, and more particularly, to a temperature controlling system and method of a battery provided in an energy storage system.

2. Description of the Related Art

As environmental destruction, resource depletion, etc., become serious problems, interest in a system capable of storing energy and efficiently using the stored energy has been increased. In addition, interest in renewable energy, which uses natural resources such as solar power, wind power and tidal power and does not generate pollution or generates little pollution in a development process, has been increased.

An energy storage system is a system that connects renewable energy, an energy storing battery, and existing energy from a grid. Many studies on the energy storage system have been conducted in response to recent environmental changes.

The battery provided in the energy storage system is implemented as a rechargeable secondary battery. The battery can be normally operated at a normal temperature, but the output of the battery has a very low value at a low temperature (e.g., −20° C. or lower), such as about 16% as compared with that at the normal temperature.

In a related art, there were proposed a method of using a heater to increase the temperature of the battery, a method of using heat generated by a resistor or electronic load, and the like.

However, in a case where the temperature of the battery is increased according to the methods in the related art, electric power of the battery is consumed. Therefore, the battery use time is reduced, and the risk of a fire is increased.

SUMMARY

Embodiments of the present invention provide a temperature controlling system of a battery, in which a switch is additionally provided in an energy storage system so as to control a charging/discharging current path to the battery, thereby controlling the temperature of the battery.

Embodiments of the present invention also provide a temperature controlling method of a battery, which increases the temperature of the battery by cutting off the coupling to a grid when the low-temperature state of the battery is sensed in the operation of an energy storage system and generating charging/discharging current to the battery using an inductor of an inverter at an output stage of the energy storage system.

In one embodiment according to the present invention, a temperature controlling system for a battery is provided. The temperature controlling system includes: a converter including a plurality of converter switches and an inductor, the converter being configured to be coupled to the battery to raise or drop a voltage output of the battery; a DC linker including a capacitor and configured to stabilize an output voltage of the converter; and an inverter including a plurality of inverter switches, at least one inductor, and an inductor switch coupled to the at least one inductor, the inverter being configured to invert the output voltage of the converter, wherein the inductor switch and at least one of the inverter switches are configured to form a current path for a current through the at least one inductor to the battery.

The inductor switch may be connected between a first current path to a first terminal of the battery and a second current path to a second terminal of the battery.

The inductor of the converter may be configured to be coupled to a first terminal of the battery, and the plurality of converter switches may include: a first switch coupled between a first terminal of the capacitor and a second terminal of the inductor; and a second switch configured to be coupled between the second terminal of the inductor and a second terminal of the battery.

The plurality of converter switches may further include a third switch that is coupled in parallel to the inductor, or is configured to be coupled between the first terminal of the battery and the first terminal of the capacitor.

The DC linker may further include a linker switch between the first terminal of the capacitor and a first terminal of the first switch of the converter.

The plurality of inverter switches may be arranged in a full-bridge configuration so as to convert an input voltage.

The at least one inductor of the inverter may include a first inductor and a second inductor, and the plurality of inverter switches may include: a first switch coupled between the first terminal of the capacitor and a first terminal of the first inductor; a second switch configured to be coupled between the first terminal of the first inductor and the second terminal of the battery; a third switch coupled between the first terminal of the capacitor and a first terminal of a second inductor; and a fourth switch configured to be coupled between the first terminal of the second inductor and the second terminal of the battery.

The first inductor may be configured to be coupled between a node between the first and second switches and a first load linker switch of a load linker configured to control a linkage between the temperature controlling system and a load.

The second inductor may be configured to be coupled between a node between the third and fourth switches and a second load linker switch of the load linker.

The plurality of inverter switches may further include a fifth switch that couples a second terminal of the first inductor to a second terminal of the second inductor.

The plurality of inverter switches may further include a fifth switch that couples a second terminal of the first inductor to the first terminal of the second inductor, or couples the first terminal of the first inductor to the second terminal of the second inductor.

In another embodiment according to the present invention, an energy storage system is configured to be coupled to at least one of a power generating system, an external load, or a grid. The energy storage system includes: a battery including a first battery terminal and a second battery terminal; and a temperature controlling system coupled to the battery and including: a converter including a plurality of converter switches and an inductor, the converter being coupled to the battery and configured to raise or drop a voltage output of the battery; a DC linker including a capacitor and configured to stabilize an output voltage of the converter; and an inverter including a plurality of inverter switches, at least one inductor, and an inductor switch coupled to the at least one inductor, the inverter being configured to invert the output voltage of the converter, wherein the inductor switch and at least one of the inverter switches are configured to form a current path for a current through the at least one inductor to the battery.

The current path formed by the inductor switch and the at least one of the inverter switches may not go through the external load.

The inductor of the converter may be coupled to the first battery terminal, and the plurality of converter switches may include: a first switch coupled between a first terminal of the capacitor and a second terminal of the inductor; and a second switch coupled between the second terminal of the inductor and the second battery terminal.

The plurality of converter switches may further include a third switch that is coupled in parallel to the inductor, or is coupled between the first battery terminal and the first terminal of the capacitor.

The DC linker may further include a linker switch between the first terminal of the capacitor and a first terminal of the first switch of the converter.

The plurality of inverter switches may be arranged in a full-bridge configuration so as to convert an input voltage.

The at least one inductor of the inverter may include a first inductor and a second inductor, and the plurality of inverter switches may include: a first switch coupled between the first terminal of the capacitor and a first terminal of the first inductor; a second switch coupled between the first terminal of the first inductor and the second battery terminal; a third switch coupled between the first terminal of the capacitor and a first terminal of a second inductor; and a fourth switch coupled between the first terminal of the second inductor and the second battery terminal.

The energy storage system may further include a load linker configured to control a linkage between the temperature controlling system and the load, wherein the first inductor may be configured to be coupled between a node between the first and second switches and a first load linker switch of the load linker.

The second inductor may be configured to be coupled between a node between the third and fourth switches and a second load linker switch of the load linker.

The plurality of inverter switches may further include a fifth switch that couples a second terminal of the first inductor to a second terminal of the second inductor.

The plurality of inverter switches may further include a fifth switch that couples a second terminal of the first inductor to the first terminal of the second inductor, or couples the first terminal of the first inductor to the second terminal of the second inductor.

In yet another embodiment according to the present invention, a temperature controlling method of a battery of an energy storage system, is provided. The method includes: sensing whether or not a low-temperature state of the battery is maintained for a reference period of time; decoupling a grid and a load from the energy storage system, when the low-temperature state of the battery is maintained for the reference period of time; forming a charging/discharging current path along which a current through at least one inductor of an inverter in the energy storage system is transmitted to the battery; and repeatedly performing charging/discharging operations of the battery through the charging/discharging current path by alternately operating a plurality of switches in the inverter.

The temperature controlling method may further include coupling the energy storage system to the load and the grid and decoupling the formed charging/discharging current path after the temperature of the battery reaches a normal temperature range.

As described above, according to embodiments of the present invention, the charging/discharging current path of a battery is controlled by additionally providing a switch in an energy storage system, so that it is possible to prevent the battery provided in the energy storage system from being left in a low-temperature state without implementing a complicated circuit for raising the temperature of the battery.

Further, the conversion between a basic driving operation of the energy storage system and an operation for controlling the temperature of the battery can be easily implemented.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
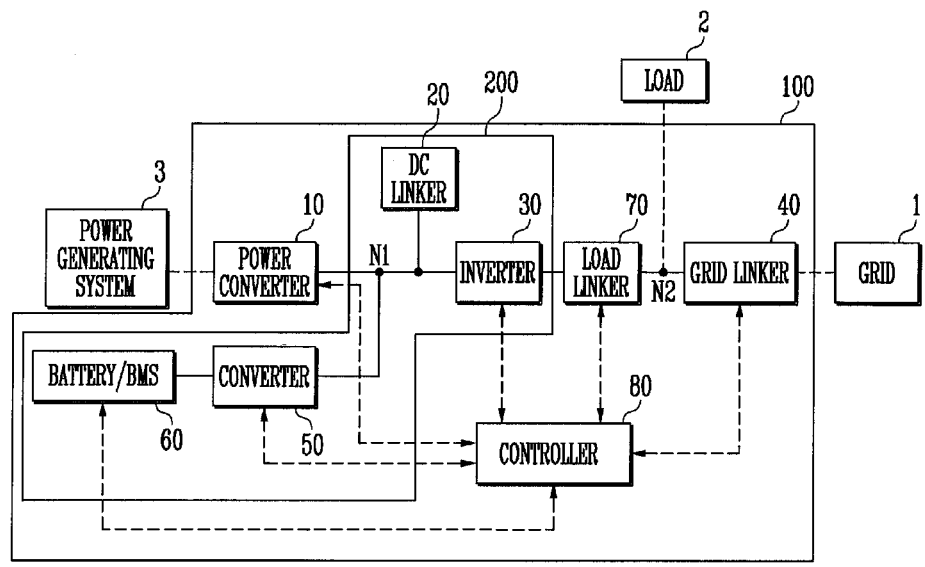
FIG. 1 is a block diagram of an energy storage system including a temperature controlling system of a battery according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to the complete understanding of the invention are omitted for clarity. Also, like reference numerals refer to like elements throughout.

FIG. 1 is a block diagram of an energy storage system including a temperature controlling system of a battery according to an embodiment of the present invention.

As shown in FIG. 1, the temperature controlling system according to the present embodiment is configured to be included in the energy storage system. The temperature controlling system performs an operation of preventing a battery provided in the energy storage system from remaining in a low-temperature state by increasing the temperature of the battery in the low-temperature state.

Referring to FIG. 1, the energy storage system 100 according to the present embodiment provides electric power to a load (e.g., an external load) 2 in connection with a power generating system 3 and a grid 1.

The power generating system 3 is a system that generates electric power, for example, using a renewable energy source. The power generating system 3 supplies the generated power to the energy storage system 100. The power generating system 3 may be a solar power generating system, a wind power generating system, a tidal power generating system, and/or the like. In addition, the power generating system 3 may include any suitable power generating systems that generate electric power using renewable energy, such as solar heat or subterranean heat.

For example, solar cells that generate electric energy using solar power may be easily installed in each home, factory, etc., such that the solar cells are suitable to be applied to the power generating system 3 coupled to the energy storage system 100.

The grid 1 may have a power plant, a transformer substation, a power-transmission line, and/or the like. In a case where the grid 1 is in a normal state, the grid 1 supplies electric power to the energy storage system 100 and/or the load 2, and/or receives the supplied power from the energy storage system 100. In a case where the grid 1 is in an abnormal state, the power supply from the grid 1 to the energy storage system 100 and/or the load 2 is stopped, and the power supply from the energy storage system 100 to the grid 1 is also stopped.

The load 2 is used to consume electric power generated from the power generating system 3, electric power stored in a battery 60 in the energy storage system 100 and/or electric power supplied from the grid 1. For example, the load 2 may be a home, factory and/or the like.

The energy storage system 100 may store electric power generated in the power generating system 3 and transmit the generated power to the grid 1. The energy storage system 100 may transmit the electric power stored in the battery 60 to the grid 1 or may store the electric power supplied from the grid 1 in the battery 60. The energy storage system 100 may supply electric power to the load 2 by performing an uninterruptible power supply (UPS) operation in an abnormal situation, e.g., when electric current is cut off from the grid 1, and may supply, to the load 2, the electric power generated in the power generating system 3 or the electric power stored in the battery 60 even when the grid 1 is in the normal state.

The energy storage system 100 includes a power converter 10, a DC linker 20, an inverter 30, a converter 50, a battery/battery management system (BMS) 60, a grid linker 40, a load linker 70 and a controller 80. The inverter 30 and the converter 50 may be implemented as a bidirectional inverter 30 and a bidirectional converter 50, respectively.

The power converter 10 is coupled between the power generating system 3 and a first node N1, and converts the electric power generated in the power generating system 3 into DC voltage of the first node N1. The operation of the power converter 10 is changed depending on the electric power generated in the power generating system 3. For example, in a case where the power generating system 3 generates AC voltage, the power converter 10 converts the AC voltage into the DC voltage of the first node N1. In a case where the power generating system 3 generates DC voltage, the power converter 10 raises or drops the DC voltage into the DC voltage of the first node N1.

For example, in a case where the power generating system 3 is a solar power generating system, the power converter 10 may be a maximum power point tracking (MPPT) converter that detects a maximum power point according to a change in solar radiation or temperature, caused by solar light and generates electric power. In addition, various kinds of converters or rectifiers may be used as the power converter 10 as those skilled in the art would appreciate.

The DC linker 20 is coupled between the first node N1 and the bidirectional inverter 30, and allows a DC link voltage Vlink of the first node to be maintained constantly (or substantially constantly). The voltage level at the first node N1 may be unstable due to an instantaneous voltage drop of the power generating system 2 or the grid 1, a peak load occurring in the load 2, and/or the like. However, the voltage of the first node N1 is maintained constantly so as to perform a stable operation of the bidirectional inverter 30 and the bidirectional converter 50. To this end, the DC linker 20 may include, for example, a capacitor such as an aluminum electrolytic capacitor, a polymer capacitor for high-voltage or a multi-layer ceramic capacitor for high voltage and high current.

The battery 60 stores electric power supplied from the power generating system 30 or the grid 1, and supplies the stored power to the load 2 or the grid 1. The battery 60 may be composed of at least one battery cell, and each battery cell may include a plurality of bare cells. The battery 60 may be implemented as various kinds of battery cells. For example, the battery 60 may be a nickel-cadmium battery, a lead storage battery, a nickel metal hybrid (NiMH) battery, a lithium battery (e.g., a lithium polymer battery or a lithium ion battery), and/or the like.

The BMS is coupled to the battery 60, and controls charging and discharging operations of the battery 60 under the control of the controller 80. To protect the battery 60, the BMS may perform an overcharging protection function, an over-discharging protection function, an overcurrent protection function, an overvoltage protection function, an overheating protection function, a cell balancing function, and/or other suitable functions. To this end, the BMS may monitor the voltage, current, temperature, remaining power, lifetime and charging state of the battery 60, and transmit the related information to the controller 80. In the embodiment of FIG. 1, it has been described as an example that the BMS is configured as a battery pack integrally formed with the battery 60. However, those skilled in the art would appreciate that the BMS may be provided separately from the battery 60.

The converter 50 DC-DC converts the voltage of power output from the battery 60 into a voltage level suitable for the inverter 30, i.e., a DC link voltage Vlink. The converter 50 DC-DC converts charging power flowed therein through the first node N1 into a voltage level required in the battery 60. Here, the charging power is, for example, electric power generated in the power generating system 3 or electric power supplied from the grid 1 through the inverter 30.

The inverter 30 is a power converter provided between the first node N1 and a second node N2 to which the load 2 and/or the grid linker 40 is coupled. The inverter 30 converts the DC link voltage Vlink output from the power generation system 3 or the battery 60 into AC voltage of the grid 1, and outputs the converted AC voltage. To store the electric power from the grid 1 in the battery 60, the inverter 30 rectifies the AC voltage of the grid 1, converts the rectified AC voltage into the DC link voltage Vlink, and then outputs the converted DC link voltage Vlink. The inverter 30 may include a filter for removing harmonics from the AC voltage output from the grid 1. The inverter 30 may include a phase locked loop (PLL) circuit for synchronizing the phase of the AC voltage output from the inverter 30 and the phase of the AC voltage of the grid 1 so as to prevent or reduce the occurrence of reactive power. In addition, the inverter 30 may perform a function of limiting a voltage variation range, a function of improving a power factor, a function of removing a DC element, a function of protecting a transient phenomenon, and/or other suitable functions.

The grid linker 40 is coupled between the grid 1 and the inverter 30. In a case where an abnormal situation occurs in the grid 1, the grid linker 40 cuts off the connection between the energy storage system 100 and the grid 1 under the control of the controller 80. The grid linker 40 may be implemented, for example, as a switching element such as a bipolar junction transistor (BJT) or field effect transistor (FET).

The load linker 70 is coupled between the inverter 30 and the load 2. The load linker 70 is coupled in series to the grid linker 40, and cuts off power flowing into the load 2 under the control of the controller 80. The load linker 70 may also be implemented, for example, as a switching element such as a BJT or FET.

In the present embodiment, the temperature controlling system 200 is configured in which the battery 60, the converter 50, the DC linker 20 and the inverter 30 among the components of the energy storage system 100 perform an operation of controlling the temperature of the battery 60.

That is, in the present embodiment, a charging/discharging current path to the battery 60 may be controlled by adding a switch to the inverter 30, so that it is possible to control the temperature of the battery 60.

Accordingly, when the maintenance of the low-temperature state of the battery for a certain period of time in the operation of the energy storage system 100 is sensed by the controller 80, the controller 80 performs an operation of increasing the temperature of the battery 60 by cutting off the connection between the grid 1 and the load 2 and generating charging/discharging current in the battery 60 using an inductor (not shown) of the inverter 30 at an output stage of the energy storage system 100.

In the present embodiment, to perform the temperature controlling operation of the battery, a switch may be added to the converter 50 and/or the DC linker 20, as well as the addition of the switch to the inverter 30. Operations of the added switches are controlled by the controller 80.

The detailed configuration and operation of the temperature controlling system 200 according to the present embodiment will be described in detail with reference to FIGS. 2 to 6.

Figure 2:
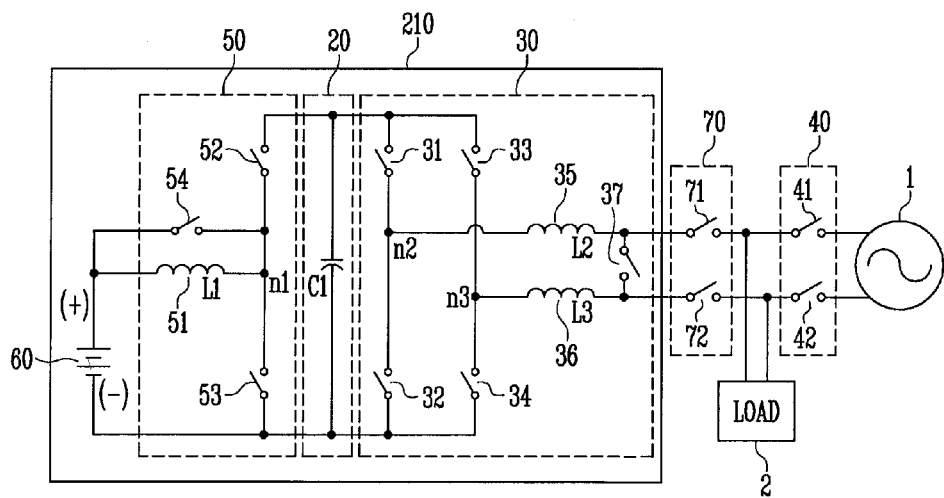
FIG. 2 is a circuit diagram of the temperature controlling system shown in FIG. 1 according to a first embodiment of the present invention.

FIG. 2 is a circuit diagram of the temperature controlling system shown in FIG. 1 according to a first embodiment of the present invention.

Referring to FIG. 2, the temperature controlling system 210 according to the first embodiment of the present invention includes the battery 60, the converter 50, the DC linker 20 and the inverter 30 among the components of the energy storage system shown in FIG. 1. The load linker 70 and the load (e.g., an external load) 2, coupled to the temperature controlling system 210, the grid liner 40 and the grid 1 are shown in FIG. 2.

Although only the battery 60 is shown in FIG. 2, this is for convenience of illustration, and the BMS may be included in the battery 60 or may be separately provided.

As shown in FIG. 2, the converter 50 includes first and second switches 52 and 53 and one inductor L1 51 so as to perform a bidirectional converting operation. In addition, the converter 50 further includes a third switch 54 coupled in parallel to the inductor 51, so as to form a charging/discharging current path directly (e.g., immediately) coupled to the battery 60 without passing through the inductor 51.

The inductor 51 may be implemented as a coil as shown in FIG. 2. The inductor 51 includes a first terminal coupled to a first terminal (+) of the battery 60 and a second terminal coupled to a node n1 between the first and second switches 52 and 53.

The first switch 52 couples a first terminal of a capacitor C1 constituting the DC linker 20 and the second terminal of the inductor 51. That is, a first terminal of the first switch 52 is coupled to the first terminal of the capacitor C1, and a second terminal of the first switch 52 is coupled to a second terminal of the inductor 51.

The second switch 53 couples the second terminal of the inductor 51 to a second terminal of the capacitor C1 constituting the DC linker 20, and a second terminal (−) of the battery 60. That is, a first terminal of the second switch 53 is coupled to the second terminal of the inductor 51, and a second terminal of the second switch 53 is coupled to the second terminal of the capacitor C1 and the second terminal (−) of the battery 60.

The first and second switches 52 and 53 may be implemented, for example, as insulated gate bipolar transistor (IGBT) or MOSFET switches. Alternatively, the first and second switches 52 and 53 may include any other suitable switching elements that perform switching functions as those skilled in the art would appreciate. In a case where the first and second switches 52 and 53 are implemented as MOSFET switches, the first terminals of the first and second switches 52 and 53 may be source terminals, and the second terminals of the first and second switches 52 and 53 may be drain terminals.

The converter 50 configured as described above may perform a bidirectional converting operation that acts as a boost converter capable of raising the voltage of power input thereto or a buck converter capable of dropping the voltage of power input thereto.

The converter 50 according to this embodiment performs a general bidirectional converting operation of an existing converter. In addition, the converter 50 further includes a third switch 54 coupled in parallel to the inductor 51 so as to form the charging/discharging current path directly (e.g., immediately) coupled to the battery 60 without passing through the inductor 51.

That is, as shown in FIG. 2, the converter 50 further includes the third switch 54 that couples the first terminal (+) of the battery and the node n1 between the first and second switches 52 and 53.

Thus, when the third switch 54 is turned on, the charging/discharging current path is formed directly (e.g., immediately) to the battery 60 without passing through the inductor 51.

In this case, the turn-on/off of the first to third switches 52, 53 and 54 are controlled by the controller 80 shown in FIG. 1.

Next, it will be described as an example that the inverter 30 is implemented in a full-bridge structure (i.e., full-bridge configuration) configured with four switches 31 to 34 as shown in FIG. 2.

However, the inverter 30 according to the present embodiment is not limited thereto, and may be implemented in a half-bridge or push-pull structure or may be configured with four or more switching elements.

More specifically, the inverter 30 includes, as shown in FIG. 2, the first to fourth switches 31 to 34 and two inductors L2 and L3 35 and 36 so as to perform a bidirectional inverting operation. In addition, the inverter 30 further includes a fifth switch 37 that couples the inductors 35 and 36 in series to each other, so as to generate charging/discharging current transmitted to the battery 60 using the inductors 35 and 36.

The first and second inductors 35 and 36 may be implemented as coils as shown in FIG. 2. The first inductor L2 35 includes a first terminal coupled to a node n2 between the first and second switches 31 and 32 among the switches implemented in the full-bridge structure (i.e., full bridge configuration), and a second terminal coupled to a first terminal of a first switch 71 of the load linker 70. The second inductor L3 36 includes a first terminal coupled to a node n3 between the third and fourth switches 33 and 34 among the switches implemented in the full-bridge structure (i.e., full-bridge configuration), and a second terminal coupled to a first terminal of a second switch 72 of the load linker 70.

Among the switches implemented in the full-bridge structure, the first switch 31 couples the first terminal of the capacitor C1 constituting the DC linker 20 to the first terminal of the first inductor L2 35. That is, a first terminal of the first switch 31 is coupled to the first terminal of the capacitor C1, and a second terminal of the first switch 31 is coupled to the first terminal of the first inductor L2 35.

The second switch 32 couples the first terminal of the inductor L2 35 to the second terminal of the capacitor C1 constituting the DC linker 20 and the second terminal (−) of the battery 60. That is, a first terminal of the second switch 32 is coupled to the first terminal of the first inductor L2 35, and a second terminal of the second switch 32 is coupled to the second terminal of the capacitor C1 and the second terminal (−) of the battery 60.

Among the switches implemented in the full-bridge structure, the third switch 33 couples the first terminal of the capacitor C1 constituting the DC linker 20 to the first terminal of the second inductor L3 36. That is, a first terminal of the third switch 33 is coupled to the first terminal of the capacitor C1, and a second terminal of the third switch 33 is coupled to the first terminal of the second inductor L3 36.

The fourth switch 34 couples the first terminal of the second inductor L3 36 to the second terminal of the capacitor C constituting the DC linker 20 and the second terminal (−) of the battery 60. That is, a first terminal of the fourth switch 34 is coupled to the first terminal of the second inductor L3 36, and a second terminal of the fourth switch 34 is coupled to the second terminal of the capacitor C1 and the second terminal (−) of the battery 60.

The first to fourth switches 31 to 34 may be implemented, for example, as IGBT or MOSFET switches. Alternatively, the first to fourth switches 31 to 34 may include any suitable switching elements that perform switching functions. In a case where the first to fourth switches 31 to 34 are implemented as MOSFET switches, the first terminals of the switches may be source terminals, and the second terminals of the switches may be drain terminals.

The inverter 30 configured as described above may convert DC voltage into AC voltage or may perform a bidirectional inverting operation of rectifying AC voltage and converting the rectified AC voltage into DC voltage.

The inverter 30 according to the present embodiment performs a general directional inverting operation of an inverter as known to those skilled in the art. In addition, the inverter 30 further includes a fifth switch 37 that couples the first and second inductors 35 and 36 in series to each other so as to generate charging/discharging current transmitted to the battery using the first and second inductors 35 and 36.

That is, in the embodiment shown in FIG. 2, the fifth switch 37 is configured to couple the second terminal of the first inductor 35 and the second terminal of the second inductor 36 to each other.

Thus, when the fifth switch 37 is turned on, the current flowing through (or generated in) the first and second inductors 35 and 36 is not transmitted to the load 2 or the grid 1 but is transmitted to the battery 60.

To this end, the switches 71 and 72 provided in the load linker 70 and switches 41 and 42 provided in the grid linker 40 are first controlled to be all turned off so that the voltage converted by the inverter 30 is not transmitted to the load 2 or the grid 1.

In this case, the turn-on/off of the first to fifth switches 31, 32, 33, 34 and 37 of the inverter 30 and the switches provided in the load linker 70 and the grid linker 40 are controlled by the controller 80 shown in FIG. 1.

Figure 3A:
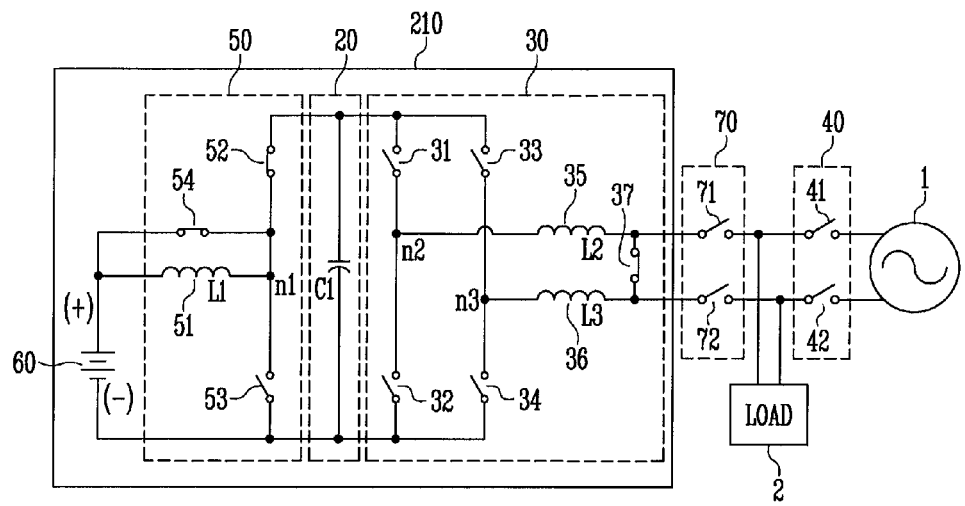
FIGS. 3A to 3C are circuit diagrams illustrating an operation of the temperature controlling system shown in FIG. 2.
Figure 3B:
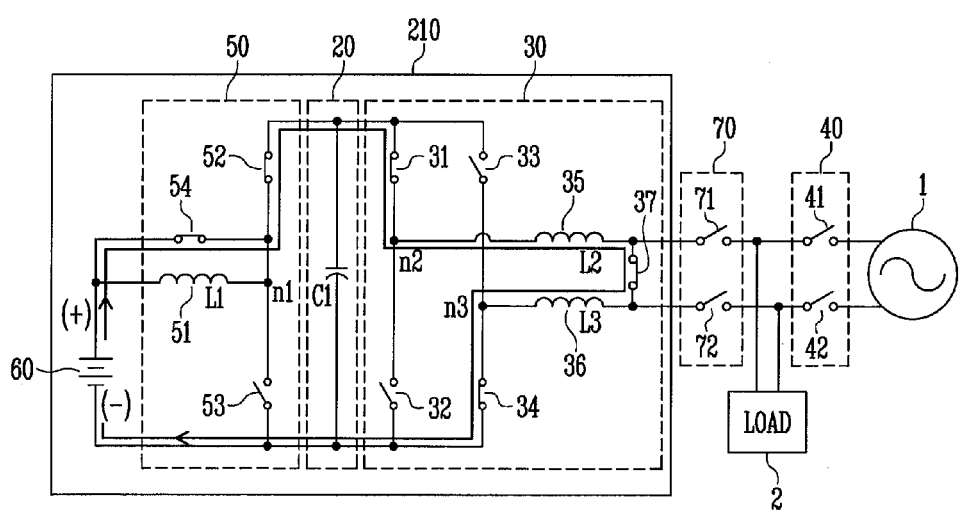
Figure 3C:
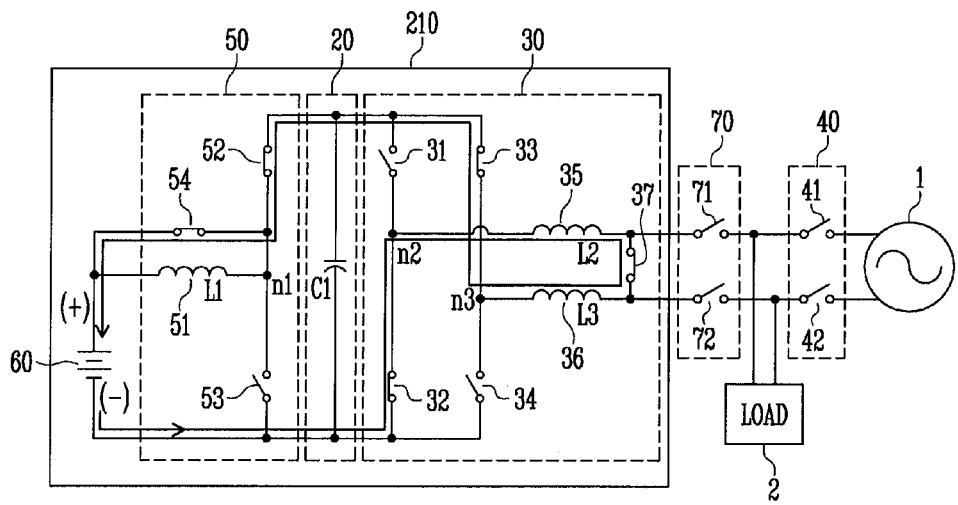

FIGS. 3A to 3C are circuit diagrams illustrating an operation of the temperature controlling system shown in FIG. 2.

The operation of the temperature controlling system described with reference to FIGS. 2 and 3 is an operation corresponding to a case in which the controller 80 senses that the low-temperature state of the battery has been maintained for a certain period of time during the operation of the energy storage system 100.

That is, the controller 80 may sense that the low-temperature state of the battery 60 is maintained for a certain period of time (e.g., a predetermined period of time) by periodically receiving information of the battery 60 through the BMS coupled to the battery 60.

When the low-temperature state of the battery 80 is sensed by the controller 80, the controller 80 controls the operation of the temperature controlling system 200 shown in FIG. 2 so as to increase the temperature of the battery 60. In this case, the basic operation of the energy storage system 100 is reserved or suspended until the battery 60 recovers a normal temperature.

While controlling the temperature of the battery 60, the controller 80 performs an operation of increasing the temperature of the battery 60 by cutting off the coupling to the grid 1 and the load 2 and generating charging/discharging current to the battery 60 using the inductors 35 and 36 of the inverter 30 at the output stage of the energy storage system 100. Hereinafter, this will be described in detail with reference to FIGS. 3A to 3C.

Referring to FIGS. 1 and 3A, when the controller 80 senses a low-temperature state of the battery 60 through the BMS coupled to the battery 60, the controller 80 cuts off the linkage between the energy storage system 100 and the load 3 and grid 1 by turning off the switches 71 and 72 of the load linker 70 and the switches 41 and 42 of the grid linker 40.

The first and second inductors 35 and 36 of the inverter 30 are coupled in series by turning on the fifth switch 37 included in the inverter 30.

The current path is formed so that the battery 60 is directly (or immediately) coupled to the inverter 30 without passing through the inductor 51 of the converter 50 by turning on the third switch 54 included in the converter 50 and the first switch 52 coupled to the first terminal of the capacitor C1 constituting the DC linker 20.

Then, the charging/discharging operations of the battery 60 are repetitively performed by alternately operating two of four switches implemented in the full-bridge structure, provided in the inverter 30.

Referring to FIG. 3B, there is shown a state in which the controller 80 turns on the first and fourth switches 31 and 34 among the switches included in the inverter 30, and turns off the second and third switches 32 and 33 among the switches included in the inverter 30.

In this case, as shown in FIG. 3B, a discharging path is formed from the first terminal (+) of the battery 60 to the second terminal (−) of the battery 60 via the third and first switches 54 and 52 of the converter 50, the first terminal of the capacitor C1 constituting the DC linker 20, and the first switch 31, the fourth switch 34, the first inductor 35, the fifth switch 37 and the second inductor 36 of the inverter 30.

That is, according to FIG. 3B, a discharging current flows from the battery 60 through the discharging path.

Referring to FIG. 3C, there is shown a state in which the controller 80 turns on the second and third switches 32 and 33 among the switches included in the inverter 30 and turns off the first and fourth switches 31 and 34 among the switches included in the inverter 30.

In this case, a charging path having the opposite direction to the discharging path of FIG. 3B is formed, and accordingly, the electric power stored in the first and second inductors 35 and 36 of the inverter 30 is transmitted to the battery 60, thereby charging the battery 60.

That is, according to FIG. 3C, charging current flows to the battery 60 through the charging path.

As shown in FIG. 3C, the charging path becomes a path from the second terminal (−) of the battery 60 to the first terminal (+) of the battery 60 via the second terminal of the capacitor C1 constituting the DC linker 20, the second switch 32, the first inductor 35, the fifth switch 37, the second inductor 36 and the third switch 33 of the inverter 30, the first terminal of the capacitor C1 constituting the DC linker 20, and the first and third switches 52 and 54 of the converter 50.

The charging and discharging current repetitively flows in (i.e., to and from) the battery 60 by repetitively performing the operations of FIGS. 3B and 3C. Thus, the temperature of the battery 60 is increased due to the current.

Then, when the temperature of the battery 60 is in a normal temperature range, the controller 80 finishes the operation of the temperature controlling system according to this embodiment, and performs the basic operation of the energy storage system 100.

That is, the controller 80 couples the energy storage system 100 to the load 3 and the grid 1 by turning on the switches 71 and 72 of the load linker 70 and the switches 41 and 42 of the grid linker 40.

The inverter 30 performs the basic bidirectional inverting operation by turning off the fifth switch 37 included in the inverter 30. Similarly, the converter 50 performs the basic bidirectional converting operation (e.g., basic bidirectional converting operation only) by turning off the third switch 54 included in the converter 50. That is, the charging/discharging path formed in the operation of the temperature controlling system is cut off.

Figure 4:
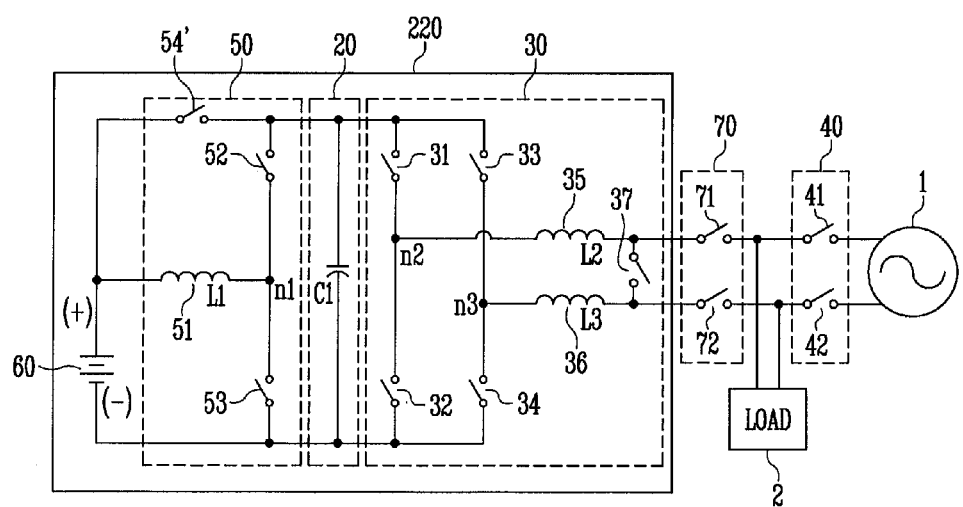
FIG. 4 is a circuit diagram of the temperature controlling system shown in FIG. 1 according to a second embodiment of the present invention.

FIG. 4 is a circuit diagram of the temperature controlling system shown in FIG. 1 according to a second embodiment of the present invention.

The configuration and operation of the embodiment shown in FIG. 4 are substantially identical to those of the embodiment shown in FIG. 2, except the coupling relationship of a third switch 54' additionally included in the converter 50. Therefore, like components are designated by like reference numerals, and their detailed descriptions will be omitted.

Referring to FIG. 4, the temperature controlling system 220 according to the second embodiment of the present invention is different from that according to the first embodiment of the present invention in that a second terminal of the third switch 54' additionally included in the converter 50 is not coupled to the node n1 between the first and second switches 52 and 53 but is coupled to the first terminal of the capacitor C1 constituting the DC linker 20.

That is, the function of the third switch 54' that forms a charging/discharging current path directly (e.g., immediately) coupled to the battery 60 without passing through the inductor 51 is substantially the same as that in the embodiment of FIG. 2.

In the embodiment of FIG. 2, the first switch 52 of the converter 50 is included in the charging/discharging current path. However, in the embodiment of FIG. 4, the second terminal of the third switch 54' is directly coupled to the first terminal of the capacitor C1, so that the first switch 52 can be removed in the charging/discharging current path.

As such, the first switch 52 of the converter 50 is removed from the charging/discharging current path, so that it is possible to reduce loss of energy and to decrease a burden of the controller 80 that controls the first switch 52. Accordingly, the loss of energy of the battery can be further reduced.

Figure 5:
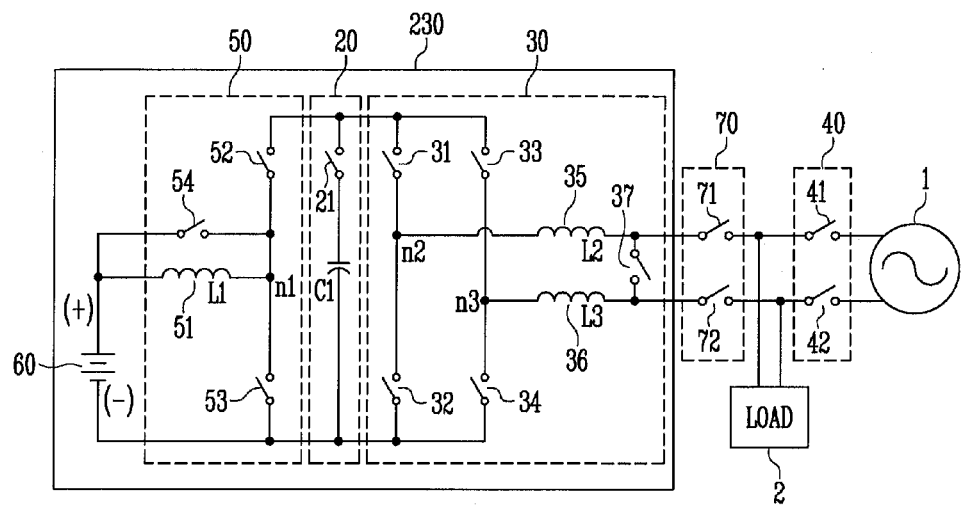
FIG. 5 is a circuit diagram of the temperature controlling system shown in FIG. 1 according to a third embodiment of the present invention.

FIG. 5 is a circuit diagram of the temperature controlling system shown in FIG. 1 according to a third embodiment of the present invention.

The configuration and operation of the embodiment shown in FIG. 5 are substantially identical to those of the embodiment shown in FIG. 2 and/or the embodiment shown in FIG. 4, except a switch 22 further provided between the first terminal of the capacitor C1 constituting the DC linker 20 and the first terminal of the first switch 52 of the converter 50. Therefore, like components are designated by like reference numerals, and their detailed descriptions will be omitted.

Referring to FIG. 5, in the temperature controlling system 230 according to the third embodiment of the present invention, the switch 22 is further provided between the first terminal of the capacitor C1 constituting the DC linker 20 and the first terminal of the first switch 52 of the converter 50.

In the embodiments described with reference to FIGS. 2 and 4, a ripple current is generated even in the capacitor C1 of the DC linker 20 by the charging/discharging current, and therefore, the lifetime of the capacitor C1 and the entire lifetime of the system may be reduced. However, in the embodiment of FIG. 5, the switch 22 is further provided between the first terminal of the capacitor C1 constituting the DC linker 20 and the first terminal of the first switch 52 of the converter 50. When the temperature controlling operation of the battery is performed, the switch 22 is turned off, so that it is possible to solve a problem cause by influence of the capacitance of the capacitor C1 constituting the DC linker 20

Figure 6:
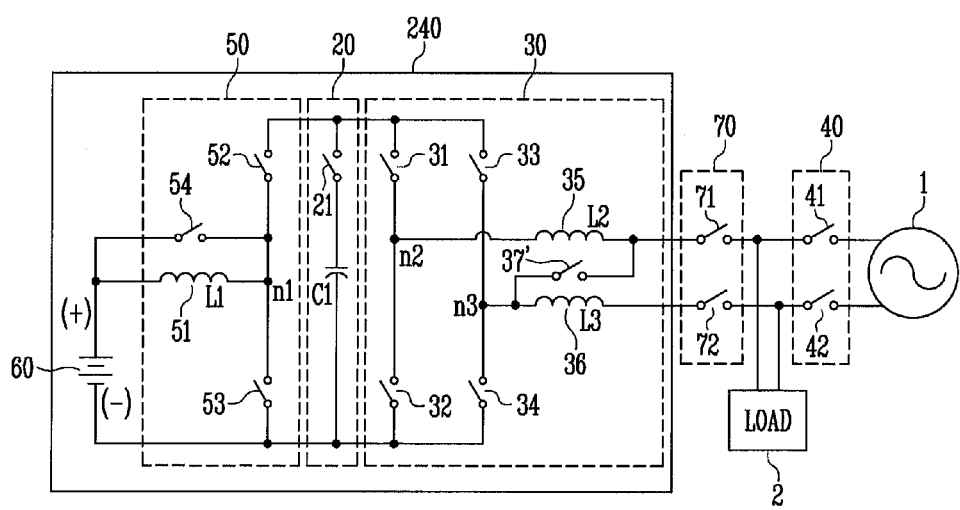
FIG. 6 is a circuit diagram of the temperature controlling system shown in FIG. 1 according to a fourth embodiment of the present invention.

FIG. 6 is a circuit diagram of the temperature controlling system shown in FIG. 1 according to a fourth embodiment of the present invention.

The configuration and operation of the embodiment shown in FIG. 6 are substantially identical to those of the first to third embodiments shown in FIGS. 2 to 5, except the coupling relationship of a fifth switch 37' additionally included in the inverter 30. Therefore, like components are designated by like reference numerals, and their detailed descriptions will be omitted.

Referring to FIG. 6, in the temperature controlling system 240 according to the fourth embodiment of the present invention, a second terminal of the fifth switch 37' additionally included in the inverter 30 is not coupled to the second terminal of the second inductor 36 but coupled to the first terminal of the second inductor 36. In other words, the fifth switch 37' is configured to couple the second terminal of the first inductor 35 and the first terminal of the second inductor 36.

In a case where the fifth switch 37' is configured to couple the second terminal of the second inductor 36 and the first terminal of the first inductor 35, the same or substantially the same effect can be obtained.

In the first to third embodiments described above, when the fifth switch 37 is turned on, the first and second inductors L1 and L2 35 and 36 are coupled in series to each other so as to increase inductance. On the other hand, in the fourth embodiment shown in FIG. 6, only one of the first and second inductors 35 and 36 is coupled to the charging/discharging current path, and thus the inductance is decreased as compared with that in the other embodiments. When the inductance is decreased, it is possible to further accelerate an amount (or a degree) of temperature rise of the battery according to an increase in the charging/discharging current of the battery.

While the present invention has been described in connection with certain exemplary embodiments, it is to be understood that the invention is not limited to the disclosed embodi-

What is claimed is:

1. A temperature controlling system for a battery, the temperature controlling system comprising:
a converter comprising a plurality of converter switches and an inductor, the converter being configured to be coupled to the battery to raise or drop a voltage output of the battery;
a DC linker comprising a capacitor and configured to stabilize an output voltage of the converter; and
an inverter comprising a plurality of inverter switches, at least one inductor, and an inductor switch coupled to the at least one inductor, the inverter being configured to invert the output voltage of the converter, wherein the inductor switch and at least one of the inverter switches are configured to form a current path for a current through the at least one inductor to the battery.

2. The temperature controlling system of claim 1, wherein the inductor switch is connected between a first current path to a first terminal of the battery and a second current path to a second terminal of the battery.

3. The temperature controlling system of claim 1, wherein the inductor of the converter is configured to be coupled to a first terminal of the battery, and
wherein the plurality of converter switches comprises:
a first switch coupled between a first terminal of the capacitor and a second terminal of the inductor; and
a second switch configured to be coupled between the second terminal of the inductor and a second terminal of the battery.

4. The temperature controlling system of claim 3, wherein the plurality of converter switches further comprises a third switch that is coupled in parallel to the inductor, or is configured to be coupled between the first terminal of the battery and the first terminal of the capacitor.

5. The temperature controlling system of claim 3, wherein the DC linker further comprises a linker switch between the first terminal of the capacitor and a first terminal of the first switch of the converter.

6. The temperature controlling system of claim 1, wherein the plurality of inverter switches are arranged in a full-bridge configuration so as to convert an input voltage.

7. The temperature controlling system of claim 6, wherein the at least one inductor of the inverter comprises a first inductor and a second inductor, and the plurality of inverter switches comprises:
a first switch coupled between the first terminal of the capacitor and a first terminal of the first inductor;
a second switch configured to be coupled between the first terminal of the first inductor and a second terminal of the battery;
a third switch coupled between the first terminal of the capacitor and a first terminal of a second inductor; and
a fourth switch configured to be coupled between the first terminal of the second inductor and the second terminal of the battery.

8. The temperature controlling system of claim 7, wherein the first inductor is configured to be coupled between a node between the first and second switches and a first load linker switch of a load linker configured to control a linkage between the temperature controlling system and a load.

9. The temperature controlling system of claim 8, wherein the second inductor is configured to be coupled between a node between the third and fourth switches and a second load linker switch of the load linker.

10. The temperature controlling system of claim 7, wherein the plurality of inverter switches further comprises a fifth switch that couples a second terminal of the first inductor to a second terminal of the second inductor.

11. The temperature controlling system of claim 7, wherein the plurality of inverter switches further comprises a fifth switch that couples a second terminal of the first inductor to the first terminal of the second inductor, or couples the first terminal of the first inductor to the second terminal of the second inductor.

12. An energy storage system configured to be coupled to at least one of a power generating system, an external load, or a grid, the energy storage system comprising:
a battery comprising a first battery terminal and a second battery terminal; and
a temperature controlling system coupled to the battery and comprising:
a converter comprising a plurality of converter switches and an inductor, the converter being coupled to the battery and configured to raise or drop a voltage output of the battery;
a DC linker comprising a capacitor and configured to stabilize an output voltage of the converter; and
an inverter comprising a plurality of inverter switches, at least one inductor, and an inductor switch coupled to the at least one inductor, the inverter being configured to invert the output voltage of the converter, wherein the inductor switch and at least one of the inverter switches are configured to form a current path for a current through the at least one inductor to the battery.

13. The energy storage system of claim 12, wherein the current path formed by the inductor switch and the at least one of the inverter switches does not go through the external load.

14. The energy storage system of claim 12, wherein the inductor of the converter is coupled to the first battery terminal, and
wherein the plurality of converter switches comprises:
a first switch coupled between a first terminal of the capacitor and a second terminal of the inductor; and
a second switch coupled between the second terminal of the inductor and the second battery terminal.

15. The energy storage system of claim 14, wherein the plurality of converter switches further comprises a third switch that is coupled in parallel to the inductor, or is coupled between the first battery terminal and the first terminal of the capacitor.

16. The energy storage system of claim 14, wherein the DC linker further comprises a linker switch between the first terminal of the capacitor and a first terminal of the first switch of the converter.

17. The energy storage system of claim 12, wherein the plurality of inverter switches are arranged in a full-bridge configuration so as to convert an input voltage.

18. The energy storage system of claim 17, wherein the at least one inductor of the inverter comprises a first inductor and a second inductor, and the plurality of inverter switches comprises:
a first switch coupled between the first terminal of the capacitor and a first terminal of the first inductor;
a second switch coupled between the first terminal of the first inductor and the second battery terminal;
a third switch coupled between the first terminal of the capacitor and a first terminal of a second inductor; and
a fourth switch coupled between the first terminal of the second inductor and the second battery terminal.

19. The energy storage system of claim 18, further comprising a load linker configured to control a linkage between the temperature controlling system and the load, wherein the first inductor is configured to be coupled between a node between the first and second switches and a first load linker switch of the load linker.

20. The energy storage system of claim 19, wherein the second inductor is configured to be coupled between a node between the third and fourth switches and a second load linker switch of the load linker.

21. The energy storage system of claim 18, wherein the plurality of inverter switches further comprises a fifth switch that couples a second terminal of the first inductor to a second terminal of the second inductor.

22. The energy storage system of claim 18, wherein the plurality of inverter switches further comprises a fifth switch that couples a second terminal of the first inductor to the first terminal of the second inductor, or couples the first terminal of the first inductor to the second terminal of the second inductor.

* * * * *